United States Patent
Kishiyama et al.

(10) Patent No.: US 8,027,244 B2
(45) Date of Patent: Sep. 27, 2011

(54) BASE STATION APPARATUS, MOBILE STATION APPARATUS, AND METHOD OF TRANSMITTING SYNCHRONIZATION CHANNELS

(75) Inventors: Yoshihisa Kishiyama, Yokosuka (JP);
Satoshi Nagata, Yokosuka (JP);
Motohiro Tanno, Yokohama (JP);
Kenichi Higuchi, Yokohama (JP);
Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 12/665,352

(22) PCT Filed: Jun. 16, 2008

(86) PCT No.: PCT/JP2008/061002
§ 371 (c)(1),
(2), (4) Date: Mar. 29, 2010

(87) PCT Pub. No.: WO2008/156065
PCT Pub. Date: Dec. 24, 2008

(65) Prior Publication Data
US 2010/0182966 A1 Jul. 22, 2010

(30) Foreign Application Priority Data

Jun. 19, 2007 (JP) .................................. 2007-161945
Jun. 25, 2007 (JP) .................................. 2007-167009

(51) Int. Cl.
*H04J 11/00* (2006.01)
*H04J 3/06* (2006.01)
(52) U.S. Cl. ....................................... 370/208; 370/503
(58) Field of Classification Search .................. 370/208, 370/335, 342, 350
See application file for complete search history.

(56) References Cited

U.S. PATENT DOCUMENTS

| | | | |
|---|---|---|---|
| 2008/0205375 A1* | 8/2008 | Onggosanusi et al. | 370/350 |
| 2008/0291945 A1* | 11/2008 | Luo | 370/509 |
| 2009/0046702 A1* | 2/2009 | Luo et al. | 370/350 |
| 2009/0086713 A1* | 4/2009 | Luo | 370/350 |
| 2009/0135803 A1* | 5/2009 | Luo et al. | 370/350 |
| 2009/0232125 A1* | 9/2009 | Kim et al. | 370/350 |
| 2009/0238065 A1* | 9/2009 | Dapper et al. | 370/208 |
| 2009/0262712 A1* | 10/2009 | Seyama et al. | 370/336 |
| 2010/0067500 A1* | 3/2010 | Kim et al. | 370/336 |
| 2011/0007728 A1* | 1/2011 | Jading et al. | 370/342 |

(Continued)

FOREIGN PATENT DOCUMENTS

JP 2003-134548 A 5/2003

(Continued)

OTHER PUBLICATIONS

Japanese Office Action for Application No. 2007-167009, mailed on Dec. 1, 2009 (7 pages).

(Continued)

*Primary Examiner* — Andrew Lee
(74) *Attorney, Agent, or Firm* — Osha • Liang LLP

(57) ABSTRACT

A base station apparatus in a radio communications system is disclosed. The base station apparatus communicates with a mobile station using an OFDM scheme in downlink. The base station apparatus includes a sync signal generating unit which generates a secondary sync channel; a multiplying unit which multiplies a scramble code with the secondary sync channel; and a transmitting unit which transmits the secondary sync channel with which the scramble code is multiplied. Cell-specific information is detected by the secondary sync channel.

17 Claims, 12 Drawing Sheets

U.S. PATENT DOCUMENTS

2011/0044159 A1* 2/2011 Kishiyama et al. ............ 370/208

FOREIGN PATENT DOCUMENTS

| JP | 2008-141741 A | 6/2008 |
|---|---|---|
| WO | 2008057752 A2 | 5/2008 |

OTHER PUBLICATIONS

3GPP TSG RAN WG1 Meeting #46; R1-062095 Tallinn, Estonia, Aug. 28-Sep. 1, 2006 Source: NTT DoCoMo et al. "Three-Step Cell Search Method for E-Utra" (4 pages).

NTT DoCoMo, et al., "S-SCH Structure for E-UTRA Downlink," 3GPP TSG RAN WG1 Meeting #49, R1-072414, Kobe, Japan, May 7-11, 2007, 6 pages.

International Search Report w/translation from PCT/JP2008/061002 dated Aug. 19, 2008 (4 pages).

3GPP TSG RAN1#49-bis; R1-072663; "Cell Search e-mail reflector summary"; Motorola; Jun. 11, 2007 (4 pages).

Patent Abstracts of Japan; Publication No. 2003-134548 dated May 9, 2003 (1 page).

3GPP TSG RAN WG1 Meeting #48bis; R1-071628; "S-SCH Structure for E-UTRA Downlink"; NTT DoCoMo, Inc. et al.; St. Julians, Malta; Mar. 26-30, 2007 (8 pages).

3GPP TSG RAN WG1 Meeting #49bis; R1-072940; "Scrambling Method for S-SCH in E-UTRA Downlink"; NTT DoCoMo, Inc. et al.; Orlando, USA; Jun. 25-29, 2007 (4 pages).

Nagata, Satoshi et al.; "OFDM Musen Access o Mochiiru Evolved UTRA ni Okeru Doki Channel Keiretsu no Hyoka"; IEICE Technical Report, vol. 107, No. 147; The Institute of Electronics, Information and Communication Engineers; Jul. 12, 2007; pp. 119-124 (8 pages).

Patent Abstracts of Japan; Publication No. 2008-141741 dated Jun. 19, 2008 (1 page).

3GPP TR 25.814 V7.0.0; "Physical layer aspects for evolved Universal Terrestrial Radio Access (UTRA)", Jun. 2006 (126 pages).

TSG-RAN WG1 #46bis; R1-062990; "Outcome of cell search drafting session"; Nokia et al.; Seoul, Korea; Oct. 9-13, 2006 (2 pages).

3GPP TSG RAN WG1 46bis; R1-062636; "Cell Search Performance in Tightly Synchronized Network for E-UTRA"; Texas Instruments; Seoul, Korea; Oct. 9-13, 2006 (8 pages).

3GPP TSG-RAN WG1 #47-bis; R1-070428; "Further analysis of initial cell search for Approach 1 and 2—single cell scenario"; Qualcomm Europe; Sorrento, Italy; Jan. 15-19, 2007 (10 pages).

3GPP TS 36.211 V1.0.0; "Physical Channels and Modulation"; Mar. 2007 (30 pages).

3GPP TSG-RAN WG1 LTE Ad Hoc Meeting; R1-060042; "SCH Structure and Cell Search Method in E-UTRA Downlink"; NTT DoCoMo, Inc. et al.; Helsinki, Finland; Jan. 23-25, 2006 (9 pages).

3GPP TSG-RAN WG1 #48bis; R1-071584; "Secondary Synchronization Signal Design"; Ericsson; Malta; Mar. 26-30, 2007 (7 pages).

3GPP TSG RAN1 #48bis; R1-071794; "Way forward for stage 2.5 details of SCH"; Qualcomm Japan et al; St. Julian's, Malta; Mar. 26-30, 2007 (1 page).

Chu; David C.; "Polyphase Codes With Good Periodic Correlation Properties"; IEEE Trans. on Inform. Theory; vol. 38; Jul. 1972; pp. 531-532 (2 pages).

Frank, R.L. et al.; "Phase shift pulse codes with good periodic correlation properties"; IRE Trans. on Info. Theory; vol. IT-8; Oct. 1962; pp. 381-382 (4 pages).

Golay, M.J.E.; "Complementary Serioes"; IRE Trans. on Inform. Theory; vol. 7; Apr. 1961; pp. 82-87 (6 pages).

3GPP TSG RAN WG1 #46bis; R1-062487; "Hierarchical SCH signals suitable for both (FDD and TDD) modes of E-UTRA"; Huawei; Seoul, Korea; Oct. 9-13, 2006 (4 pages).

3GPP TSG RAN WG1 Meeting #47bis; R1-070146; "S-SCH Sequence Design"; Motorola; Sorrento, Italy; Jan. 15-19, 2007 (5 pages).

3GPP TSG-RAN WG1 #49, R1-072093; "Details on SSC sequence design"; Qualcomm Europe; Kobe, Japan; May 7-11, 2007 (5 pages).

3GPP TSG RAN WG1 Meeting #48bis, R1-071641; "Frequency Hopping/Shiffing of Downlink Reference Signal in E-UTRA"; St. Julians, Malta; Mar. 26-30, 2007 (3 pages).

3GPP TSG-RAN WG1#49; R1-072368; "Mapping of Short Sequences for S-SCH"; Nortel; Kobe, Japan; May 7-11, 2007 (4 pages).

3GPP TSG RAN WG1 #49; R1-072326; "S-SCH sequences based on concatenated Golay-Hadamard codes"; Kobe, Japan; May 7-11, 2007 (7 pages).

3GPP TSG RAN WG1 49; R1-072189; "View on Remaining Issues on SCH Design"; Texas Instruments; Kobe, Japan; Mar. 26-30, 2007 (4 pages).

3GPP TSG RAN WG1 #49; R1-072328; "Secondary-Synchronization Channel Design"; LG Electronics; Kobe, Japan; May 7-11, 2007 (8 pages).

RAN WG1 meeting 49; R1-072110; "Secondary Synchronisation Codes for LTE cell search"; NEC Group; Kobe; May 7-11, 2007 (22 pages).

3GPP TSG RAN WG1 Meeting #49 bis; R1-072661; "Scrambling Method for Two S-SCH Short Code"; Orlando, FL USA; Jun. 25-29, 2007 (4 pages).

Written Opinion from PCT/JP2008/061002 dated Aug. 19, 2008 (5 pages).

Extended European Search Report for Application No. 08777240.6, mailed on May 24, 2011 (9 pages).

\* cited by examiner

BASE STATION APPARATUS, MOBILE STATION APPARATUS, AND METHOD OF TRANSMITTING SYNCHRONIZATION CHANNELS

BACKGROUND OF THE INVENTION

1. Field of the Invention

The present invention generally relates to radio communications systems to which Orthogonal Frequency Division Multiplexing (OFDM) is applied in downlink and specifically relates to base station apparatuses, mobile station apparatuses, and methods of transmitting synchronization channels.

2. Description of the Related Art

As a communications scheme to succeed W-CDMA (Wideband Code Division Multiple Access) and HSDPA, Long Term Evolution (LTE) is being studied in a W-CDMA standardization body called 3GPP. Moreover, as radio access schemes, the OFDM is being considered for downlink, while SC-FDMA (Single-Carrier Frequency Division Multiple Access) is being considered for uplink (see Non-patent document 1, for example).

The OFDM, which is a scheme for dividing a frequency band into multiple narrow frequency bands (sub-carriers) and overlaying data onto the respective frequency bands for transmission, densely arranges the sub-carriers on the frequency axis such that one sub-carrier partially overlaps another sub-carrier without their interfering with each other, making it possible to achieve high-speed transmission and to improve frequency utilization efficiency.

The SC-FDMA is a transmission scheme which divides a frequency bandwidth and transmits using different frequency bands among multiple terminals to make it possible to reduce interference between the terminals. The SC-FDMA, which features a reduced variation in transmission power, makes it possible to achieve wide coverage as well as low power consumption of the terminals.

In the LTE, the OFDM provides for two types of CPs (Cyclic Prefixes) for reducing the effect of intersymbol interference by a delay wave, namely a Long CP and a Short CP with different lengths. For example, the Long CP is applied in a cell with a large cell radius and at the time of transmitting an MBMS (Multimedia Broadcast Multicast Service) signal, while the Short LP is applied in a cell with a small cell radius. The number of OFDM symbols is 6 when the Long CP is applied and 7 when the short CP is applied.

Now, in a radio communications system using W-CDMA, LTE, etc., a mobile station must generally detect a cell with good radio quality for the own station based on a synchronization (sync) signal, etc., at the time of turning on the power, in a standby status, during communications, or at the time of intermittent reception during communications. The process, which is meant to search for a cell to which a radio link is to be connected, is called a cell search. The cell search method is generally determined based on a time needed for the cell search as well as throughput of the mobile station at the time of conducting the cell search. In other words, the above-described cell search method should be such that the time needed for the cell search is short and the throughput of the mobile station at the time of conducting the cell search is small.

In the W-CDMA, the cell search is conducted using two types of synchronization signals, namely a Primary SCH (P-SCH) and a Secondary SCH (S-SCH). Similarly, conducting the cell search using the two types of the synchronization signals P-SCH and S-SCH is also being considered in the LTE.

For example, a cell search method is being considered such that the P-SCH with one sequence and S-SCH with multiple sequences are transmitted at time intervals of 5 ms (Non-patent document 2). In the above-described method, a downlink receive timing from a cell is specified using the P-SCH, while a receive frame timing is detected and a cell-specific information set such as a cell ID, or cell group ID is specified using the S-SCH transmitted in the same slot. Here, it is generally possible to use a channel estimation value determined from the P-SCH in demodulating and decoding the S-SCH. Then, the cell IDs to be grouped are detected from those cell IDs belonging to the detected cell group ID. For example, the cell ID is calculated based on a signal pattern of a pilot signal. Moreover, the cell ID is calculated based on the demodulation and decoding of the P-SCH and the S-SCH, for example. Alternatively, without grouping the cell IDs, the cell ID may be included as an information element of the S-SCH. In this case, the mobile station can detect the cell ID at the time of demodulating and decoding the S-SCH.

However, in an inter-station synchronization method in which signals from multiple cells are being synchronized, when the above-described cell search method is applied, a problem occurs such that the S-SCHs transmitted from multiple cells in different sequences are demodulated and decoded based on the channel estimation value determined from the P-SCHs transmitted from multiple cells in the same sequence. Here, the transmission characteristics also include a time needed for the cell search, for example. For a non-inter-station synchronization system in which signals from multiple cells are not being synchronized, receive timings of the P-SCH sequences transmitted from the multiple cells differ from one cell to another. Thus, such a problem as described above does not occur.

In order to prevent a degradation in the S-SCH characteristics in the inter-station synchronization system as described above, a cell search method is being considered such that the number of the P-SCH sequences is increased from 1 to a number no less than 2 (for example, 3 or 7) (see Non-patent document 3). Alternatively, there is a method of transmitting the P-SCH in transmission intervals which differ on a per cell basis in order to prevent the S-SCH characteristics degradation in the inter-station synchronization system as described above. In the above-described method, the P-SCHs having different timings of receiving from the multiple cells may be used in the demodulating and decoding of the S-SCH. Thus, it is made possible to prevent the S-SCH characteristic degradation as described above.

Now, from a point of view of cell design, it is deemed that the larger the number of sequences of the P-SCH in Non-patent document 3 and the types of transmission intervals of the P-SCH in Non-patent document 4, the better they are. This is because, the smaller the number of sequences of the P-SCH or the types of transmission intervals, the higher the probability of the P-SCH sequences in neighboring cells becoming the same, or the higher the probability of the P-SCH transmission intervals becoming the same, so that the probability of occurrence of the S=SCH characteristic degradation in the inter-station synchronization system becomes higher.

Moreover, there is a tradeoff relationship between the time needed for conducting the cell search as described above, or the transmission characteristics of the cell search, and the throughput of the mobile station when the cell search is being conducted. Thus, it is desirable to be able to select whether the transmission characteristics of the cell search are to be emphasized or the throughput of the mobile station when the cell search is being conducted is to be emphasized.

Non-Patent Document 1:
3GPP TR 25.814 (V7.0.0), "Physical Layer Aspects for Evolved UTRA," June 2006;

Non-Patent Document 2:
R1-062990, Outcome of cell search drafting session;

Non-Patent Document 3:
R1-062636, Cell Search Performance in Tightly Synchronized Network for E-UTRA;

Non-Patent Document 4:
R1-070428, Further analysis of initial cell search for Approach 1 and 2—single cell scenario;

Non-Patent Document 5:
3GPP TS 36.211 V1.0.0 (2007-03);

Non-Patent Document 6:
3GPP R1-060042 SCH Structure and Cell Search Method in E-UTRA Downlink;

Non-Patent Document 7:
3GPP R1-071584 Secondary Synchronization Signal Design;

Non-Patent Document 8:
3GPP R1-071794;

Non-Patent Document 9:
Chu, "Polyphase codes with good periodic correlation properties," IEEE Trans. Inform. Theory, vol. II-18, pp. 531-532, July 1972;

Non-Patent Document 10:
R. L. Frank and S. A. Zadoff, "Phase shift pulse codes with good periodic correlation properties," IRE Trans. Inform. Theory, vol. IT-8, pp. 381-382, 1962;

Non-Patent Document 11:
M. J. E. Golay, "Complementary Series," IRE Trans. Inform. Theory, vol. 7, pp. 82-87, April 1961;

Non-Patent Document 12:
3GPP, R1-062487 Hierarchical SCH signals suitable for both (FDD and TDD) modes of E-UTRA;

Non-Patent Document 13:
3GPP, R1-070146, S-SCH Sequence Design;

Non-Patent Document 14:
3GPP, R1-072093, Details on SSC Sequence Design;

Non-Patent Document 15:
3GPP, R1-071641, Frequency Hopping/Shifting of Downlink Reference Signal in E-UTRA;

Non-Patent Document 16:
3GPP, R1-072368, Mapping of Short Sequences for S-SCH;

Non-Patent Document 17:
3GPP, R1-072326, S-SCH sequences based on concatenated Golay Hadamard codes;

Non-Patent Document 18:
3GPP, R1-072189, Views on Remaining Issues on SCH Design;

Non-Patent Document 19:
3GPP, R1-072328, Secondary-Synchronization Channel Design;

Non-Patent Document 20:
3GPP, R1-072110, Secondary Synchronisation Codes for LTE cell search; and Non-Patent Document 21:
3GPP, R1-072661, Scrambling Method for Two S-SCH Short Code

SUMMARY OF THE INVENTION

Problems to be Solved by the Invention

However, the related art as described above has the following problems.

As described above, the Synchronization Channel (SCH) is a downlink signaling channel used in the cell search. It has been determined to apply a hierarchical-type SCH for this Synchronization Channel (see Non-patent document 5). In other words, the Synchronization Channel includes a Primary Synchronization Channel (P-SCH) and a Secondary Synchronization Channel (S-SCH).

Of the Primary SCH and Secondary SCH, the cell-specific information set such as the cell ID group, the information on the number of transmit antennas, and the radio frame timing is reported in the Secondary SCH. A user apparatus detects the Secondary SCH sequence to detect the cell-specific information set.

As described above, in the W-CDMA scheme, in which a surrounding-cell search is conducted for performing a handover, neighboring cell-specific information (neighboring cell information) is reported in advance to the user apparatus prior to the surrounding cell search. However, it is not decided for the LTE system, whether such surrounding cell information is to be reported. In the surrounding cell search for detecting a cell to handover to during communications or in the standby status, it is possible to decrease the number of candidate cell-specific information sets to be detected when the surrounding cell information, etc., is reported in advance.

As a method of mapping the Secondary SCH sequence, a method is being proposed of mapping different sequences in the frequency direction. For example, as illustrated in FIG. 1, an orthogonal sequence 1 ($P_1(0), P_1(1), \ldots, P_1(31)$) and an orthogonal sequence 2 ($P_2(0), P_2(0), \ldots, P_2(31)$) are mapped such that the respective sequences are alternately arranged in every other sub-carrier. Moreover, as illustrated in FIG. 2, for example, an orthogonal sequence 1 ($P_1(0), P_1(1), \ldots, P_1(31)$) and an orthogonal sequence 2 ($P_2(0), P_2(1), \ldots, P_2(31)$) are mapped such that the respective sequences are arranged in successive sub-carriers. Such dividing of sequences into multiple ones makes it possible to increase the number of patterns which may be transmitted. More specifically, when one type of sequence with a sequence length of 64 is used, for example, 64 types of the number of patterns can be transmitted, while when two types of sequences, each with a sequence length of 32, are used as shown in FIG. 2, 1024 types of the number of patterns can be transmitted.

Conventionally, as a sequence for a sync channel, it has been determined that multiple (for, example, three) types of Zadoff-Chu sequences are used for the P-SCH, while a binary sequence, which is a combination of two types of short codes, is used for the S-SCH (see Non-patent documents 5 and 8, for example).

When using such S-SCH sequence as described above, there is a problem of an increased PAPR (peak-to-average power ratio), especially in a 1.25 MHz system.

Moreover, the P-SCH and S-SCH are transmitted every 5 ms. In an inter-station synchronization system, in which signals from multiple cells are being synchronized, a mobile station receives signals from multiple cells at the same time. Here, when multiple cells transmit the same S-SCH every 5 ms, there is a problem that, in a cell, S-SCH interference occurs every 5 ms, so that the probability of detecting the S-SCH in the mobile station decreases.

Thus, in light of the problems as described above, the object of the present invention is to provide a base station apparatus, a mobile station apparatus, and a method of transmitting synchronization channels that make it possible to decrease the PAPR and to increase the probability of detecting the S-SCH.

Means for Solving the Problem

In order to solve the problem as described above, a base station apparatus in a radio communications system is provided according to the present invention, the base station apparatus communicating with a mobile station using an OFDM scheme in downlink, the base station apparatus including a sync signal generating unit which generates a secondary sync channel; a multiplying unit which multiplies a scramble code with the secondary sync channel; and a transmitting unit which transmits the secondary sync channel with which the scramble code is multiplied, wherein cell-specific information is included in the secondary sync channel.

A mobile station apparatus in a radio communications system is provided according to the present invention, the mobile station communicating with a base station apparatus in an OFDM scheme in downlink, wherein the base station apparatus generates a secondary sync channel, and multiplies a scramble code with the secondary sync channel, the mobile station further including a descrambling unit which descrambles the secondary sync channel with which the scramble code is multiplied; and a detecting unit which detects the cell-specific information based on the descrambled secondary sync channel.

A method of transmitting sync channels in a wireless communications system having a base station apparatus which communicates with a mobile station using an OFDM scheme in downlink is provided according to the present invention, the method including: a sync signal generating step in which is generated, by the base station apparatus, a secondary sync channel; a scramble code multiplying step in which is multiplied, by the base station apparatus, a scramble code with the secondary sync channel; and a transmitting step in which is transmitted, by the base station apparatus, the secondary sync channel with which the scramble code is multiplied, wherein the mobile station detects cell-specific information in the secondary sync channel.

Advantage of the Invention

The embodiments of the present invention make it possible to implement a base station apparatus, a mobile station apparatus, and a method of transmitting synchronization channels that allow reducing PAPR and improving the probability of detecting an S-SCH in a cell search.

DESCRIPTION OF THE PREFERRED EMBODIMENTS

Figure 1:
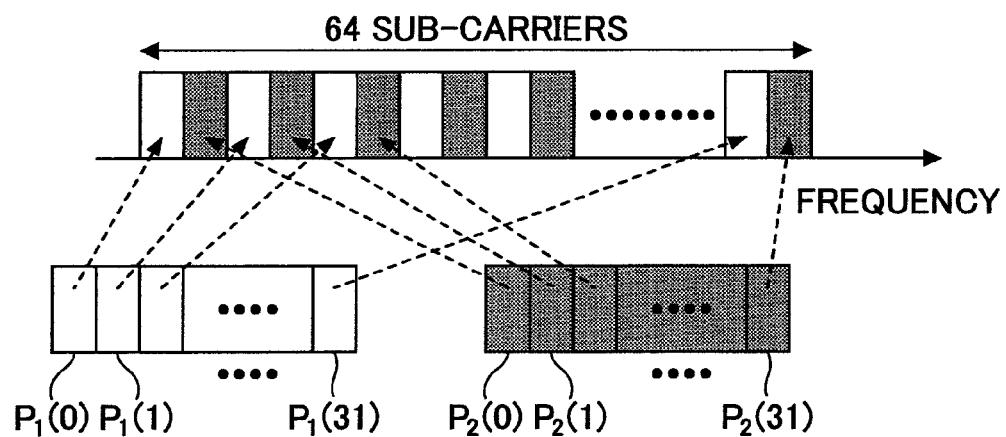
FIG. 1 is a diagram for explaining a method of mapping S-SCH sequences.
Figure 2:
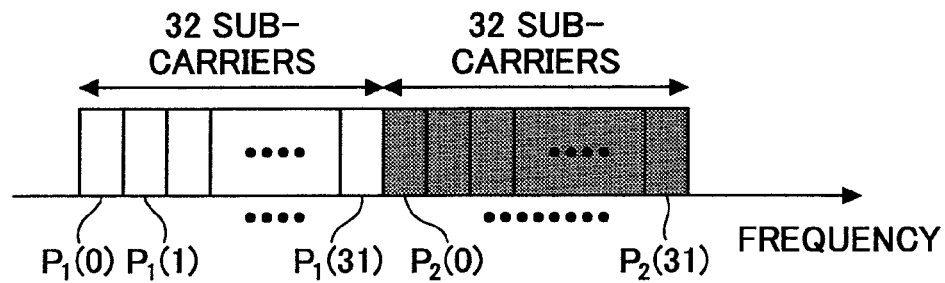
FIG. 2 is a diagram for explaining another method of mapping the S-SCH sequences.

Description of Notations $50_k$ ($50_1$, $50_2$, $50_3$) cell
$100_n$ ($100_1$, $100_2$, $100_3$, $100_4$, $100_5$) mobile station
102 basic waveform correlator
104 sync signal replica generator
106 code sequence multiplier
108 upper-level layer code correlator
110 timing detector
112 S-SCH detector
$200_m$ ($200_1$, $200_2$, $200_3$) base station apparatus
202 transmit/receive antenna
204 amplifier
206 transceiver
208 baseband signal processor
209 sync signal generator
210 call processor
212 transmission line interface
$208_1$ RLC processor
$208_2$ MAC processor
$208_3$ encoder
$208_4$ data modulator
$208_5$ multiplexer
$208_6$ serial/parallel converter
$208_7$ multiplier
$208_8$ multiplier
$208_9$ scramble code generator
$208_{10}$ amplitude adjusting unit
$208_{11}$ combiner
$208_{12}$ inverse Fourier transformer
$208_{13}$ CP adder
$209_1$ sync signal controller
$209_2$ sync signal generator
$209_3$ data modulator
$209_4$ serial/parallel converter
$209_5$ multiplier
$209_6$ amplitude adjusting unit
252 P-SCH generator
254 S-SCH generator
256 multiplier
258 scramble sequence generator 260 multiplexer
300 access gateway apparatus
400 core network
1000 radio communications system

BEST MODE OF CARRYING OUT THE INVENTION

A description is given below with regard to embodiments of the present invention. Throughout the drawings for explaining the embodiments, same letters are used for those having the same functions, so that repetitive explanations are omitted.

Figure 3:
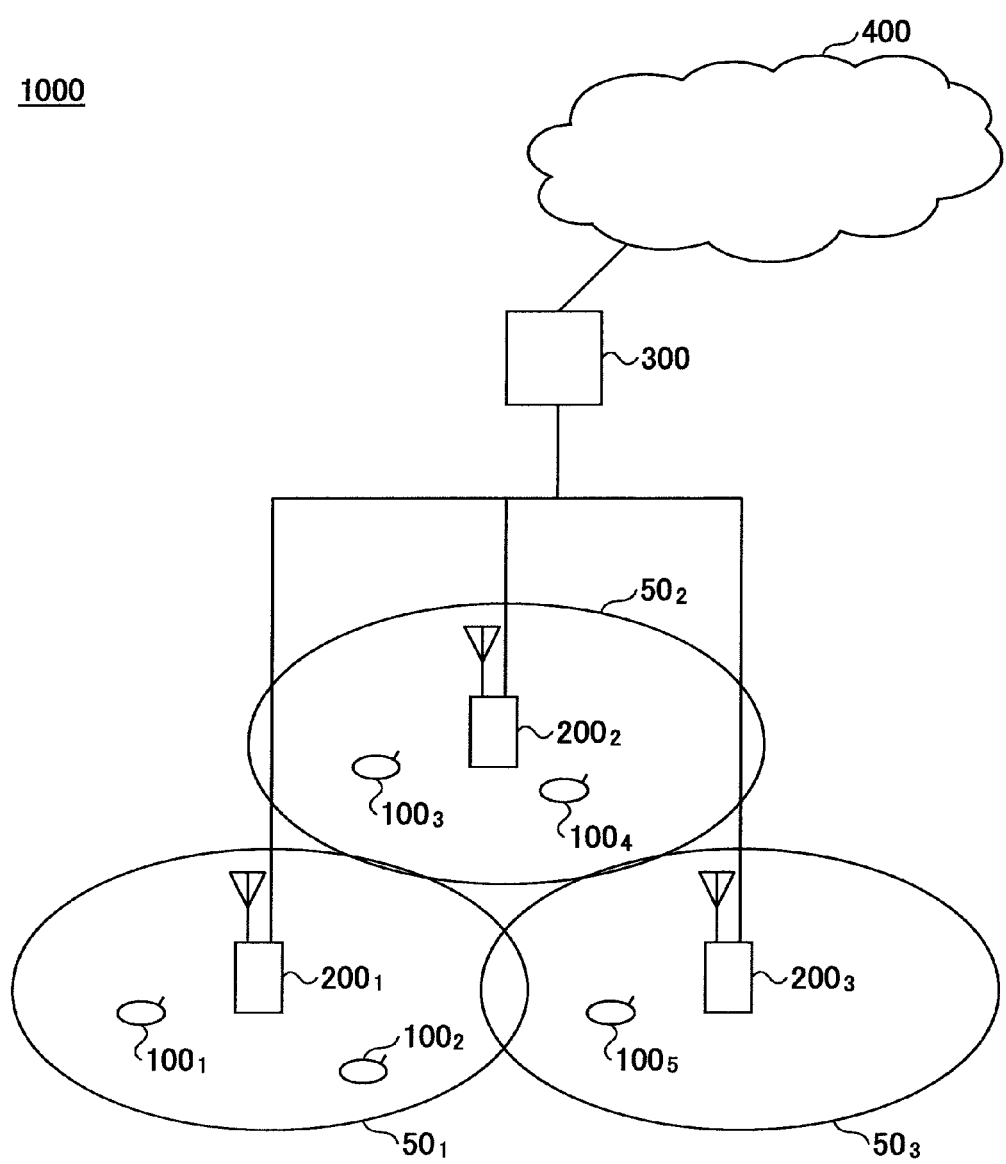
FIG. 3 is a block diagram illustrating a configuration of a radio communications system according to an embodiment of the present invention.

A radio communications system having base and mobile station apparatuses according to an embodiment of the present invention is described with reference to FIG. 3.

The radio communications system 1000 is a system to which Evolved UTRA and UTRAN (also called Long Term Evolution or Super 3G) is applied, for example. The radio communications system 1000 includes a base station apparatus (eNB: eNode B) $200_m$ ($200_1, 200_2, 200_3, \ldots, 200_m$, where m is an integer greater than 0), and multiple mobile station apparatuses $100_n$ ($100_1, 100_2, 100_3, \ldots, 100_n$, where n is an integer greater than 0) in communication with the base station apparatus $200_m$. The base station apparatus 200 is connected to an upper-layer station, for example, an access gateway apparatus 300, which access gateway apparatus is connected to a core network 400. The mobile station $100_n$ communicates with the base station apparatus $200_m$ via Evolved UTRA and UTRAN in any of cells $50_k$ ($50_1, 50_2, \ldots 50_k$, where k is an integer greater than 0).

Here, it is assumed that the mobile stations $100n$ represent a mix of those having a communications channel established and in communication with any of the base station apparatuses $200_m$, and those not having a communications channel established with and not in communication with any of the base station apparatuses $200_m$.

The base station apparatus $200_m$ transmits a synchronization (sync) signal. The mobile station $100_n$, which is located in any of cells $50_k$ ($50_1, 50_2, 50_3, \ldots 50_k$, where k is an integer greater than 0), conducts, based on the sync signal, a cell search in which a cell with a good radio quality for the own station is detected. In other words, the mobile station $100_n$ detects symbol and frame timings using the sync signal and detects cell-specific control information such as a cell ID (cell-specific scramble code generated from the cell ID) or a collection of cell IDs (below-called cell ID group).

Here, the cell search is conducted for both those mobile stations $100_n$ which are in communication and those mobile stations $100_n$ which are not in communication. For example, the cell search for those mobile stations in communication includes a cell search for detecting a cell of the same frequency, a cell search for detecting a cell of a different frequency, etc. Moreover, the cell search for those mobile stations not in communication includes a cell search at the time of turning on the power, a cell search in a standby status, etc.

Below, base station apparatuses $200_m$ ($200_1, 200_2, 200_3, \ldots, 200_m$) have the same configuration, function, and status. Thus, unless otherwise specified, they are described below as a base station $200_m$. Below, the mobile stations $100_n$ ($100_1, 100_2, 100_3, \ldots, 100_n$) have the same configuration, function, and status. Thus, unless otherwise specified, they are described below as the mobile station $100_n$. Below, cells $50_k$ ($50_1, 50_2, 50_3, \ldots, 50_k$) have the same configuration, function, and status. Thus, unless otherwise indicated, they are described below as the cell $50_k$.

For the radio communications system 1000, OFDM (Orthogonal Frequency Division Multiplexing) is applied for downlink and SC-FDMA (Single Carrier-Frequency Division Multiple Access) is applied for uplink as radio access schemes. As described above, the OFDM is a scheme which divides a frequency band into multiple narrow frequency bands (sub-carriers) and overlays data onto the respective frequency bands for transmission. The SC-FDMA is a transmission scheme which divides a frequency bandwidth and transmits using different frequency bands among multiple terminals to make it possible to reduce interference between the terminals.

Here, communication channels in Evolved UTRA and UTRAN are described.

For downlink, a PDSCH (physical downlink shared channel), which is shared for use by the mobile stations $100_n$, and a downlink control channel for LTE are used. In downlink, transport format information and mobile station information that are mapped to the physical downlink shared channel, transport format information and mobile station information that are mapped to the physical uplink shared channel, acknowledgement information on the physical uplink shared channel, etc., are reported by the downlink control channel for LTE, while user data are transmitted by the physical downlink shared channel.

Moreover, in downlink, the base station apparatus $200_m$ transmits a sync signal for the mobile station $100_n$ to conduct the cell search.

For uplink, a PUSCH (physical uplink shared channel), which is shared for use by the mobile stations $100_n$ and an uplink control channel for LTE are used. There are two types of uplink control channels, a channel which is time multiplexed with the physical uplink Shared channel and a channel which is frequency multiplexed with the same.

In uplink, downlink physical shared channel HARQ ACK information and downlink CQI (Channel Quality Indicator) information for use in downlink physical shared channel scheduling, and AMC (Adaptive Modulation and Coding) are transmitted by the uplink control channel for LTE. Moreover, user data are transmitted by the physical uplink shared channel.

Figure 4:
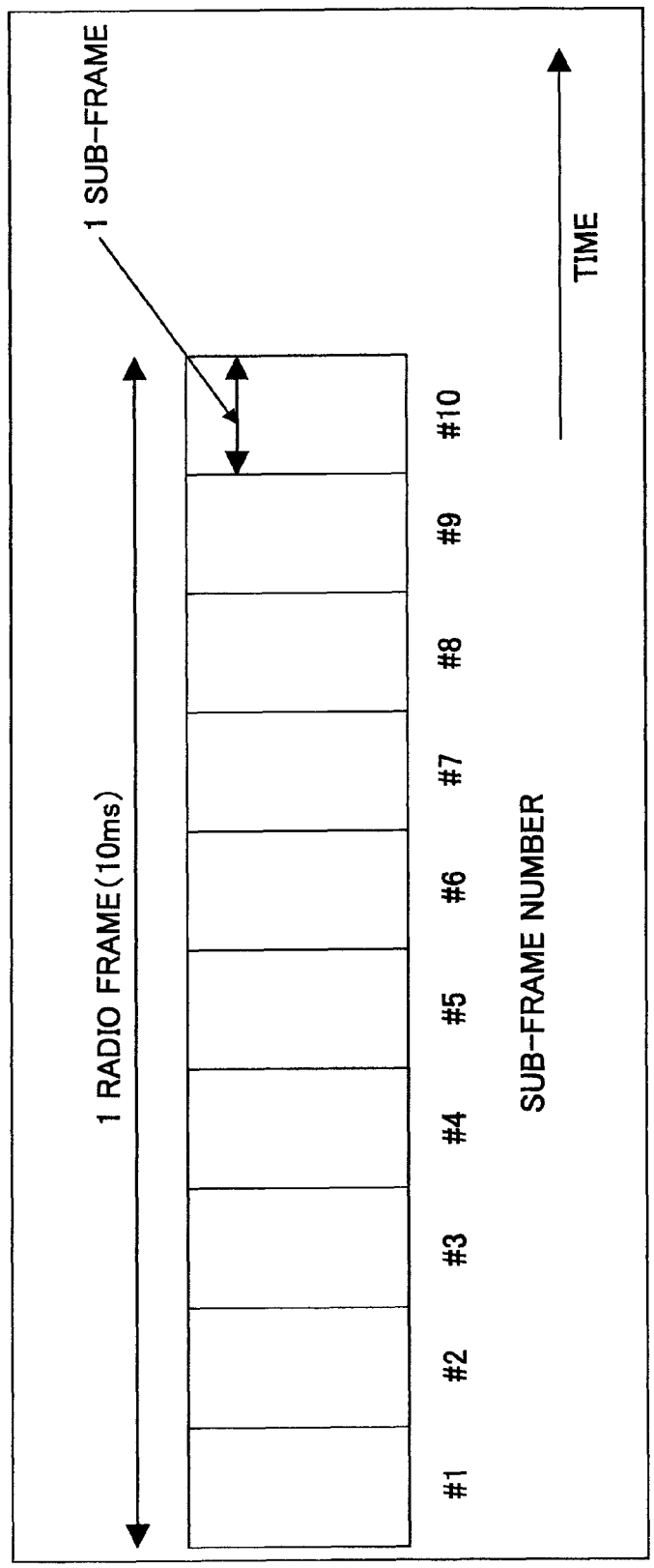
FIG. 4 is a diagram for explaining a radio frame configuration.
Figure 5:
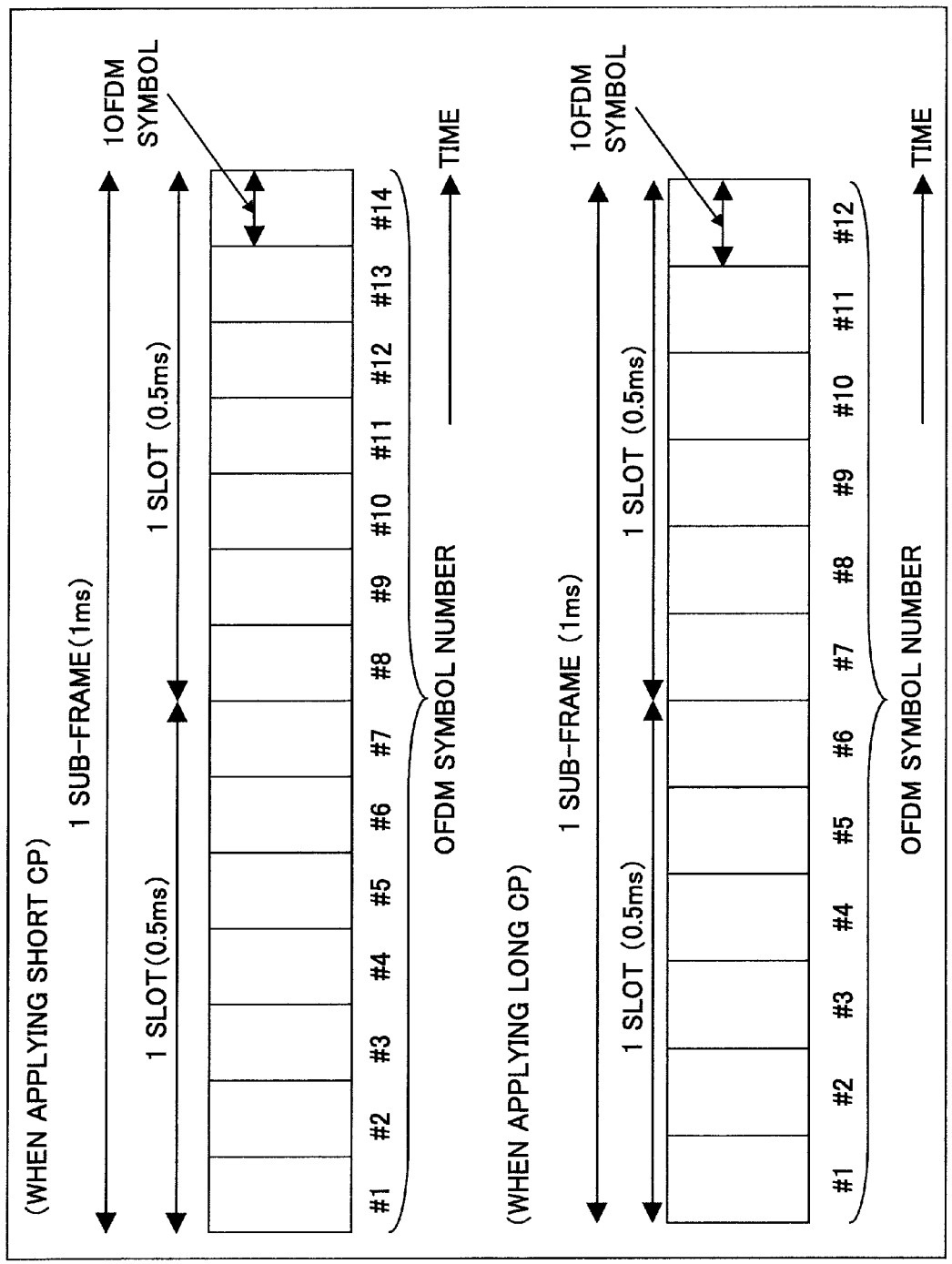
FIG. 5 is a diagram for explaining sub-frame configurations.

As shown in FIG. 4, in downlink transmission, there are 10 sub-frames within one radio frame, which one radio frame is 10 ms. Moreover, as shown in FIG. 5, one sub-frame includes two slots with one slot including 7 OFDM symbols for using a Short CP (upper portion of FIG. 5) and one slot including 6 OFDM symbols for using a Long CP (lower portion of FIG. 5).

Figure 6:
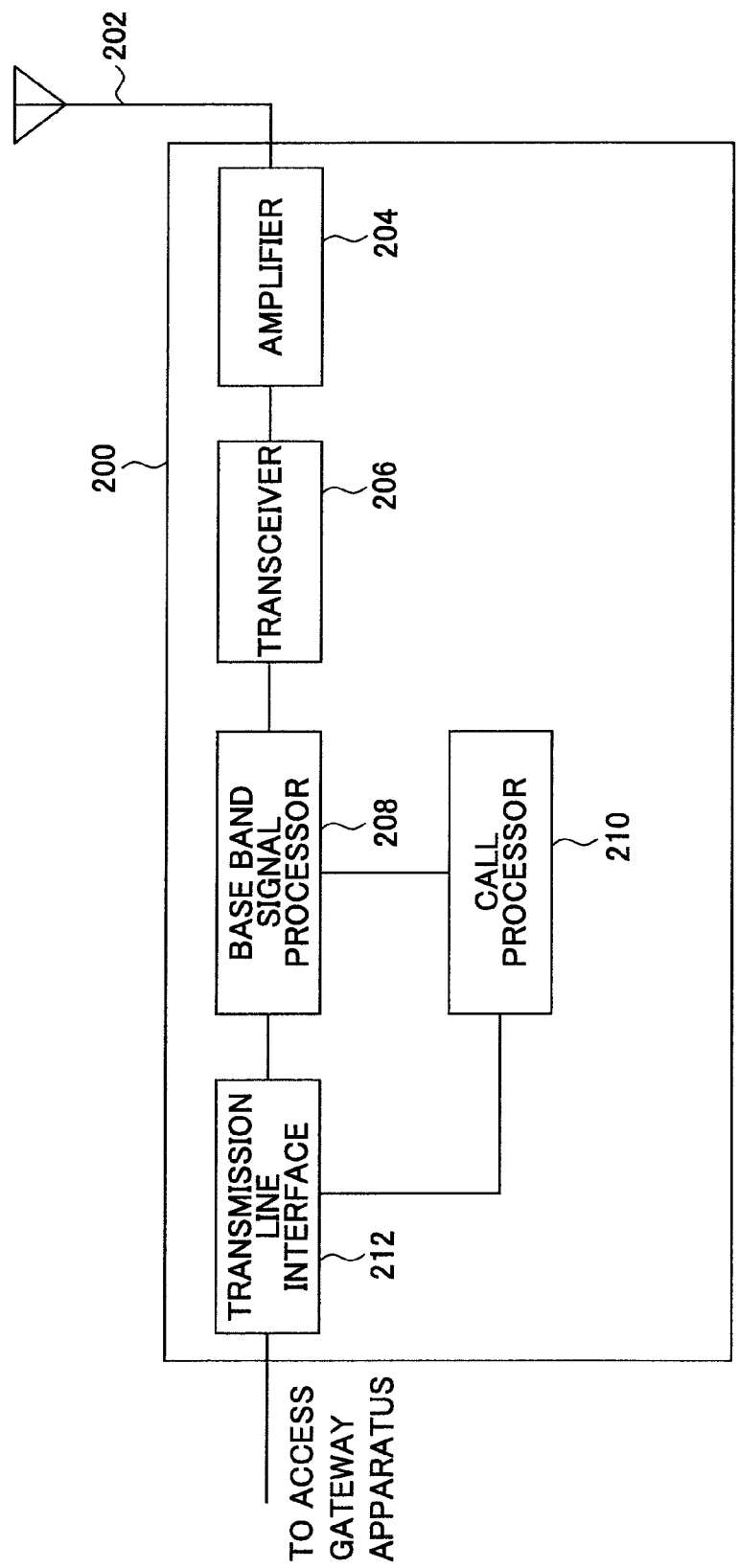
FIG. 6 is a partial block diagram illustrating a base station apparatus according to an embodiment of the present invention.

Next, the mobile station apparatus $200_m$ according to the embodiment of the present invention is described with reference to FIG. 6.

The mobile station apparatus 200 according to the present embodiment includes a transmit/receive antenna 202, an amplifier 204, a transceiver 206, a base band signal processor 208, a call processor 210, and a transmission line interface 212.

Packet data transmitted from the base station apparatus $200_m$ to the mobile station $100_n$ in downlink is input from an upper-layer station which is located at a layer upper to the base station apparatus 200 (for example, the access gateway 300) via the transmission line interface 212 to the base band signal processor 208.

In the base band signal processor 208, the packet data undergoes segmentation/concatenation, an RLC (radio link control) layer transmission process such as an RLC retransmission control transmission process, MAC retransmission control (for example, a HARQ (Hybrid automatic repeat request) transmission process), scheduling, transmission format selection, channel encoding, and an inverse fast Fourier transform (IFFT) process before they are transferred to the transceiver 206. Moreover, in the base band signal processor 208, the sync signal is generated as described below. The sync signal is multiplexed to be packet data, so that the multiplexed result is transferred to the transceiver.

The transceiver 206 frequency converts a base band signal output from the base band signal processor 208 to a radio frequency band, after which the radio frequency band signal is amplified at the amplifier 204, then is transmitted from the transmit/receive antenna 202. Here, the base band signal is the above-described packet data or sync signal.

On the other hand, for data transmitted from the mobile station $100_n$ to the base station apparatus $200_m$ in uplink, a radio frequency signal received at the transmit/receive antenna 202 is amplified at the amplifier 204, which amplified signal is frequency converted at the transceiver 206 to the base band signal, which is input to the base band signal processor 208.

The base band signal processor 208 performs an FFT process, error correction decoding, an MAC retransmission control reception process, and an RLC layer reception process on the input base band signal, which processed signal is transferred to the access gateway apparatus 300 via the transmission line interface 212.

The call processor 210 performs status management and resource allocation for the radio base station 200.

Figure 7:
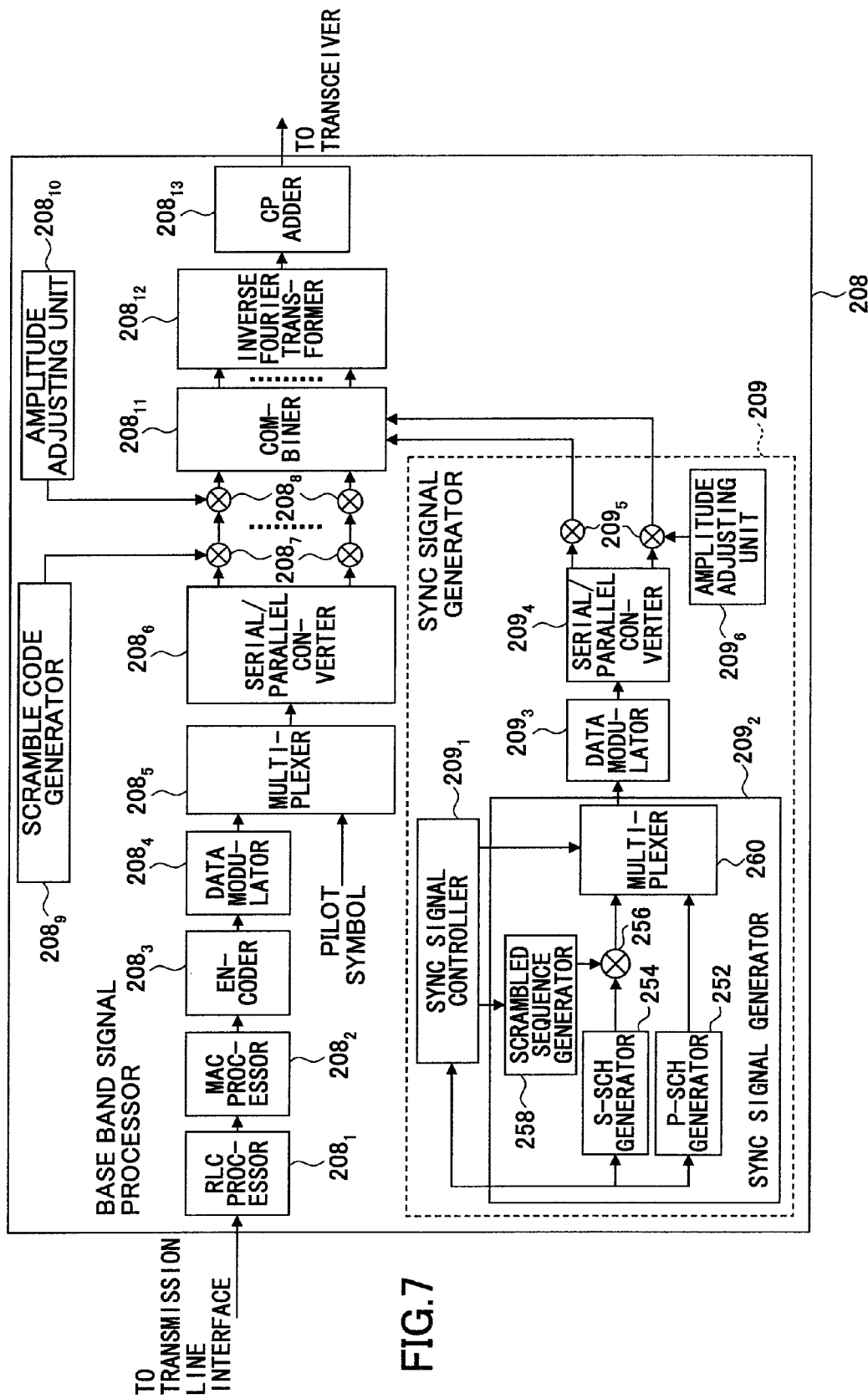
FIG. 7 is a block diagram illustrating a base band signal processor of the base station apparatus according to an embodiment of the present invention.

Next, a configuration of the base band signal processor 208 is described with reference to FIG. 7. The embodiment according to the present invention relates primarily to downlink, so that those parts related to the downlink process are shown, while those parts related to the uplink process are omitted.

The base band signal processor 208 includes an RLC processor $208_1$, a MAC (Medium Access Control) processor $208_2$, an encoder $208_3$, a data modulator $208_4$, a multiplexer $208_5$, a serial/parallel converter $208_6$, a multiplier $208_7$, a multiplier $208_8$, a scramble code generator $208_9$, an amplitude adjusting unit $208_{10}$, a combiner $208_{11}$, an IFFT (IDFT) $208_{12}$, a CP adder $208_{13}$, and a sync signal generator 209.

The downlink packet data transmission data sequence received from the transmission line interface undergoes segmentation/concatenation, and an RLC layer transmission process such as an RLC retransmission control transmission process in the RLC processor $208_1$; and a HARQ (Hybrid automatic repeat request) transmission process and a MAC layer transmission process such as scheduling, transmission format selection, or frequency resource allocation in the MAC processor $208_2$ before it is encoded in the encoder $208_3$ and data modulated in the data modulator $208_4$. Then, a pilot symbol is multiplexed to be the data modulated transmission data sequence in the multiplexer $208_5$, and the pilot symbol-multiplexed transmission data sequence is serial/parallel converted in the serial/parallel converter $208_6$ to N information symbol sequences on the frequency axis so that they are lined up on the axis. Here, the pilot symbol is a downlink reference signal, for example. A scramble code output by the scramble code generator $208_9$ is multiplied in the frequency direction with N information symbol sequences lined up in the frequency axis as described above in the N multipliers $208_7$, and then an amplitude-adjusting sequence value output by the amplitude adjusting unit $208_{10}$ is multiplied with the scramble code-multiplied symbol sequence in the N multipliers $208_8$, which multiplied results are output to the combiner $208_{11}$. The combiner $208_{11}$ multiplexes, with the scramble code and amplitude adjusting sequence value-multiplied symbol sequence with a code length of N, the sync signal generated at the sync signal generator 209, which multiplexed result is further multiplexed to be a relevant particular sub-carrier out of N sub-carriers.

As described below, numbers of a sub-frame and a slot in which the sync signal is transmitted are determined by the sync signal controller $209_1$. For the sub-frame number and the slot number in which the sync signal is transmitted, the sync signal generated by the sync signal generator 209 is multiplexed with the scramble code and amplitude adjusting sequence value-multiplied downlink packet data symbol sequence with the sequence length of N. However, for the sub-frame number and the slot number in which the sync signal is not transmitted, the sync signal generated by the sync signal generator 209 is not multiplexed, so that only the scramble code and amplitude adjusting sequence value-multiplied downlink packet data symbol sequence with the sequence length of N is transmitted to the inverse Fourier transformer $208_{12}$. The sync signal-multiplexed sub-carrier is located at a band which includes the center of the whole frequency bandwidth, for example. Moreover, the sync signal-multiplexed sub-carrier bandwidth is 1.25 MHz, for example.

The inverse Fourier transformer (IFFT) $208_{12}$ transforms N symbols to be an orthogonal multi-carrier signal. The CP adder $208_{13}$ inserts a CP in this multi-carrier signal for each Fourier period. For each cell, which of two types of CP lengths Long CP and Short CP is to be used is selected.

The sync signal generating process in the sync signal generator 209 is described. The sync signal includes a first sync signal (below called P-SCH) and a second sync signal (below called S-SCH). The sync signal generator 209 includes a sync signal controller $209_1$, a sync signal generator $209_2$, a data modulator $209_3$, a serial/parallel converter $209_4$, a multiplier $209_5$, and an amplitude adjusting unit $209_6$. The sync signal generator $209_2$ includes a P-SCH generator 252, an S-SCH generator 254, a multiplier 256, a scramble sequence generator 258, and a multiplexer 260. The sync signal controller $209_1$ is connected to the P-SCH generator 252, the S-SCH generator 254, the scramble sequence generator 258, and the multiplexer 260 of the sync signal generator $209_2$.

The sync signal controller $209_1$ determines sequence numbers of the P-SCH and S-SCH, and the sub-frame and slot numbers in which the P-SCH and S-SCH are to be transmitted based on the cell ID or cell group ID of the cell providing communications by the relevant base station apparatus $200_m$ using the Evolved UTRA and UTRAN. The mobile station may specify the cell based on a pilot signal (in other words, a signal pattern of a Reference signal) after the cell ID group is specified, for example. In this case, the cell ID and the Reference Signal pattern are specified in advance, for example. Alternatively, the mobile station may specify the cell based on demodulating and decoding of the P-SCH and S-SCH, for example. In this case, the P-SCH sequence number and cell ID information are specified in advance, for example. For the P-SCH, a different sequence is selected per sector. For example, the P-SCH sequence for a three-sector cell is selected from a set which includes three different sequences.

Then, the sync signal controller $209_1$ reports the P-SCH sequence number to the P-SCH generator 252, and the S-SCH sequence number to the S-SCH generator 254. Moreover, the sync signal controller $209_1$ reports, to the multiplexer 260 as sync signal timing information, the numbers of the sub-frame and slot in which the P-SCH and S-SCH are to be transmitted.

For example, the radio communications system 1000 defines the numbers of the sub-frame and slot in which the P-SCH and S-SCH are transmitted. In this example, using multiple types (for example, three types) of P-SCH sequences, sync signals are transmitted in the sub-frame numbers 1 and 6 (see FIG. 8). Moreover, in this example, the P-SCH being mapped to the last OFDM symbol of the slot makes it possible to demodulate the P-SCH regardless of whether the Long CP or Short CP is used in the mobile station. The reason is that, in the last OFDM symbol of the slot, the 6th OFDM symbol when the Long CP is applied and the 7th OFDM symbol when the Short CP is applied match in time. In other words, in both the short CP and the long CP, the beginning and end timings of the slot match. Here, the radio communications system may associate the P-SCH sequence number with the cell ID information in advance. Such association as described above being performed by the radio communications system 1000 makes it possible for the sync signal controller 209$_1$ of each of the base station apparatuses 200$_m$ to determine the P-SCH sequence number based on the cell ID of the cell which provides communications using the Evolved UTRA and UTRAN.

In general, a communications area provided by the base station apparatus 200$_m$ is divided into two or more areas. This is called sectorization. When the base station apparatus 200$_m$ has multiple sectors, the cell ID or cell ID group may be used as an ID of an area combining all the sectors of the base station apparatus 200$_m$, or as an ID of each sector of the base station apparatus 200$_m$. When the cell ID or cell ID group is used as the ID of the area combining all the sectors of the base station apparatus 200$_m$, a combination of the sync signal sequence and the numbers of the sub-frame and slot in which the sync signal is transmitted is set up per base station apparatus 200$_m$. When the cell ID or cell ID group is used as the ID of the respective sectors of the base station apparatus 200$_m$, the above-described combination of the sync signal sequence and the numbers of the sub-frame and slot in which the sync signal is transmitted is set up per sector of the base station apparatus 200$_m$.

As the P-SCH sequence, a CAZAC (Constant Amplitude Zero AutoCorrelation sequence) such as a Zadoff-Chu sequence (Non-patent document 9), a Frank sequence (Non-patent document 10), a Golay Complementary sequence (Non-patent document 11), a Double Repetitive Golay Complementary sequence (Non-patent document 12), a PN (Pseudo Noise) sequence, etc., may be used.

Moreover, as the S-SCH sequence, a two layer-type S-SCH sequence to which an orthogonal sequence is multiplied by a scramble sequence, which is a non-orthogonal sequence, may be used (Non-patent document 13), an S-SCH sequence in which multiple different orthogonal sequences are arranged alternately in the frequency domain or an S-SCH sequence in which multiple different orthogonal sequences are multiplied by the non-orthogonal scramble sequence may be used (Non-patent document 6), an S-SCH sequence in which multiple different orthogonal sequences are arranged in consecutive sub-carriers may be used (Non-patent document 7), or an S-SCH sequence in which the multiple different orthogonal sequences, which are arranged in consecutive sub-carriers, are multiplied by the non-orthogonal scramble sequence may be used. As the orthogonal sequence, a Walsh-Hadamard sequence, a phase-rotation orthogonal sequence, a PN sequence, or an M sequence may be used (Non-patent document 14), while, as the non-orthogonal sequences, the CAZAC sequences such as a GCL sequence, the Golay sequence, the Goley Complementary Sequence, the PN sequence, etc., may be used (Non-patent document 11).

The P-SCH generator 252 and the S-SCH generator 254 respectively generate the P-SCH and S-SCH sequences based on the sync signal sequence information and sync signal transmission timing information that are reported by the sync signal controller 209$_1$.

For example, when generating the S-SCH, the sync signal generator 209$_2$ may put cell-specific information reported in the S-SCH into a hierarchy. The cell-specific information includes at least one information set of cell ID groups, a radio frame timing, and information on the number of transmit antennas. Here, the radio communications system 1000 may be arranged to report some of information sets put into the hierarchy as advance information such as surrounding cell information when the mobile station conducts a cell search. For example, as the advance information, the radio communications system 1000 may be arranged to report the cell ID groups, some of the cell ID groups, the radio frame timing, information on the number of transmit antennas, or what is included in any one information set of information sets combining the cell ID groups, some of the cell ID groups, the radio frame timing, and the information on the number of transmit antennas. Such an arrangement as described above makes it possible to reduce the number of sequences detected at the time the mobile station conducts the cell search.

Figure 9:
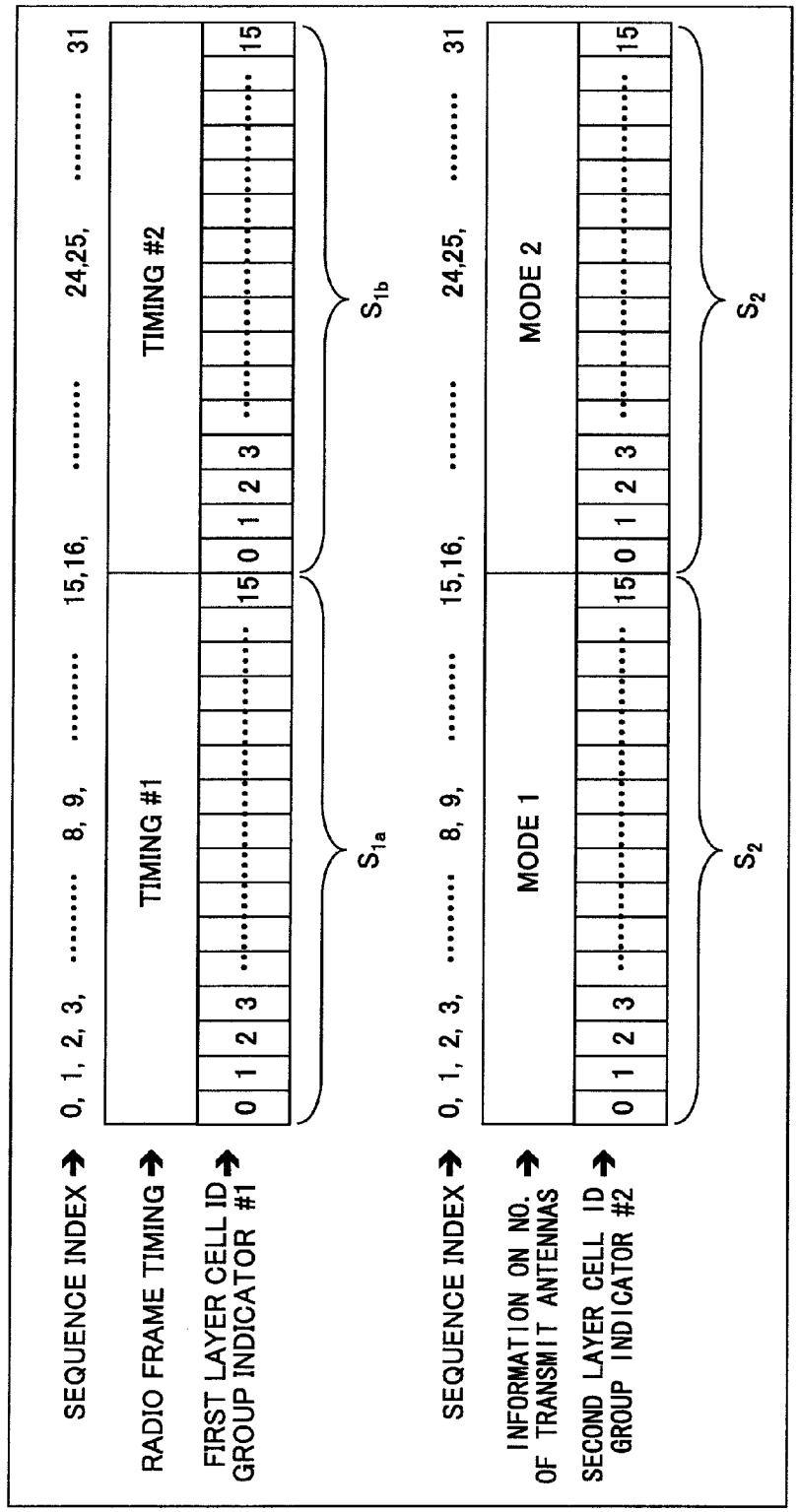
FIG. 9 is a diagram for explaining a method of mapping the S-SCH sequences according to an embodiment of the present invention.

More specifically, as shown in FIG. 9, for example, the cell ID group is divided into multiple types of sequences (for example, two types of sequences, each of which includes 32 short codes). FIG. 9 shows a first layer cell ID group as a sequence 1 having 32 short codes, each of the short codes having a sequence length of 32 and a second layer cell ID group as a sequence 2 having 32 short codes, each of the short codes having a sequence length of 32. It may be set to have the radio frame timing transmitted in the sequence 1 and information on the number of antennas transmitted in the sequence 2. Moreover, the short codes belonging to the first layer cell ID group, each of which short codes are assigned sequence indices 0-31 for the sequence 1, are divided in two and are assigned further sequence indices 0-15. Such further sequence indices are called first layer cell ID group indicators. For example, as the S-SCH sequence, a Walsh-Hadamard sequence may be used. The sequence indices 0-31 being assigned to the Walsh-Hadamard sequence are divided into 0-15 and 16-31 portions, to each of which portions 0-15 are collated as the first layer cell indicator #1. In this case, numbers 0-15 of the first layer cell ID group indicator #1 that correspond to the sequence indices 0-15 are used as the first layer cell ID group used for the S-SCH transmitted in a radio frame timing #1 and numbers 0-15 of the first layer cell ID group indicator #1 that correspond to the sequence indices 16-31 are used as the first layer cell ID group used for the S-SCH transmitted in a radio frame timing #2.

Moreover, the short codes belonging to the second layer cell ID group, each of the short codes being aasigned sequence indices 0-31 for the sequence 2, are divided in two and are assigned further sequence indices 0-15. Such further sequence indices are called second layer cell ID group indicators. For example, as the S-SCH sequence, the Walsh-Hadamard sequence may be used. The sequence indices 0-31 assigned to the Walsh-Hadamard sequence are divided into 0-16 and 16-31 portions, to each of which portions 0-15 are collated as the second layer cell indicator #2. In this case, numbers 0-15 of the second layer cell ID group indicator #2 that correspond to the sequence indices 0-15 are used as the second layer cell ID group used for the S-SCH transmitted in the radio frame timing #1 and numbers 0-15 of the second layer cell ID group indicator #2 that correspond to the sequence indices 16-31 are used as the second layer cell ID group used for the S-SCH transmitted in the radio frame timing #2.

As shown, the cell ID group is detected using combinations of the first layer cell ID group indicator #1 and the second layer cell ID group indicator #2. For example, it is detected using a combination of the short code ($S_{1a}$) as the first layer cell ID group indicator #1 and the short code ($S_2$) as the second layer cell ID group indicator #2 in the frame timing #1 and a combination of the short code ($S_{1b}$) as the first layer cell ID group indicator #1 and the short code ($S_2$) as the second layer cell ID group indicator #2 in the frame timing #2. In this case, the combinations may be determined such that no collision of the cell ID groups occurs between {$S_{1a}$, $S_2$} and {$S_{1b}$, $S_2$}. The advance information on the radio frame timing or on the number of transmit antennas in the target cell may be reported to simplify the cell search procedure. For example, when the timing #1 is reported in advance as the advance information, the S-SCH is detected using combinations of the timing #2 and the information on the number of transmit antennas. In this case, the S-SCH is detected from 16×32 combinations. In FIG. 9, a case has been described such that the first layer cell ID group and the radio frame timing are associated and the second layer cell ID group and the information on the number of transmit antennas are associated. Such associations as described above may be modified appropriately.

Figure 10:
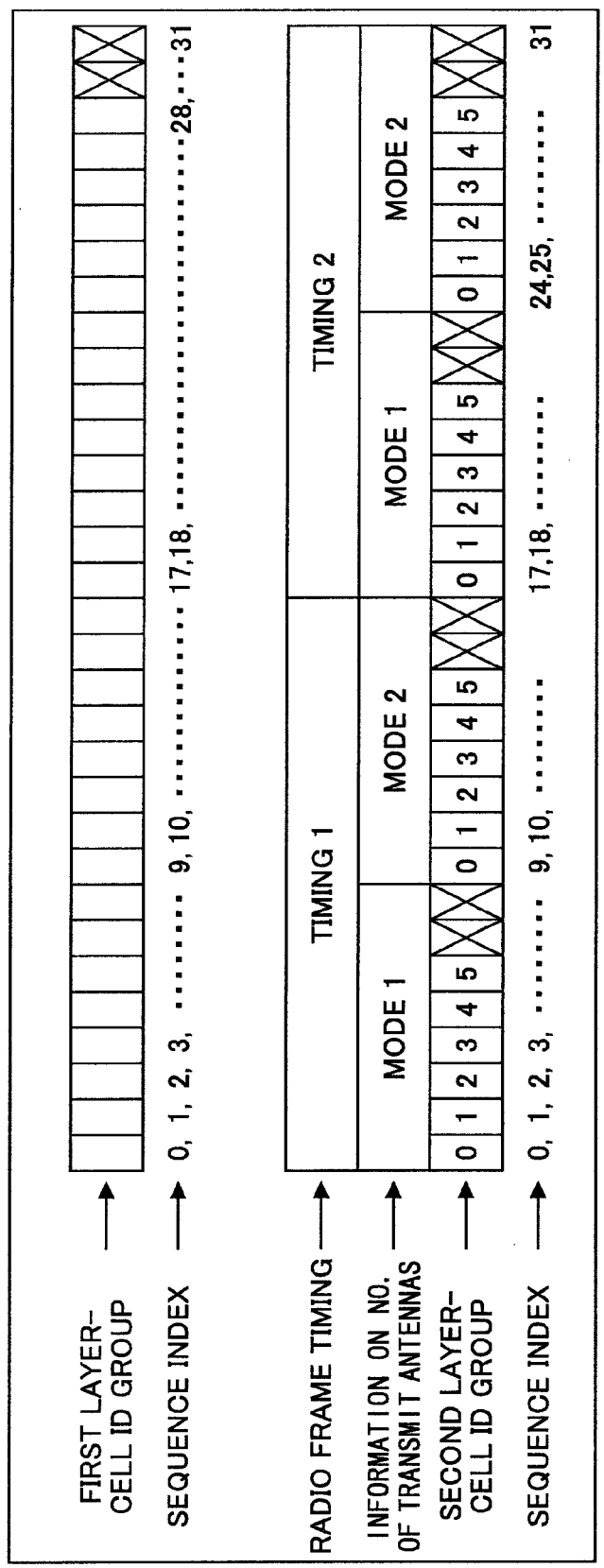
FIG. 10 is a diagram for explaining a method of mapping the S-SCH sequences according to an embodiment of the present invention.

Moreover, as shown in FIG. 10, for example, the cell ID group may be divided into multiple types of sequences, for example, two types of sequences, each having 29 and 6 short codes. FIG. 10 shows a first layer cell ID group as a sequence 1 having 29 short codes, each short code having a sequence length of 29 and a second layer cell ID group as a sequence 2 having 6 short codes, each short code having a sequence length of 6. In the sequence 2, it may be set to have the radio frame timing and/or information on the number of transmit antennas transmitted. For example, when the cell ID group is reported as advance information to the mobile station, the mobile station, at the time of handover, needs to detect only the radio frame timing and information on the number of transmit antennas. In the LTE, it has been proposed, for hopping/shifting of a downlink reference signal, to divide the downlink reference signal into 29 hopping patterns and 6 shifting patterns so as to transmit the divided result (see Non-patent document 15, for example). The above-described information sets transmitted in two types of sequences may be collated with the downlink reference signal frequency hopping/shifting patterns. In this way, when the frequency hopping pattern is reported using advance information, for example, the first layer cell ID group is reported, thus making it possible to omit the step of detecting the first layer cell ID group.

Moreover, when generating the S-SCH, the sync signal generator $209_2$ does not have to put the cell-specific information reported in the S-SCH into the hierarchy, for example. For example, when cell-specific information is mapped to two types of short codes, a method may be used of selecting the sequence numbers of each short code from at least one combination of information sets of the cell ID group, the frame timing, and the information on the number of transmit antennas, which are cell-specific information, such that interference in a particular cell becomes small, or more specifically that the probability of collision due to having the same code assigned to neighboring cells becomes small (see non-patent document 16).

Moreover, as disclosed in non-patent document 17, for example, at least one combination of information sets of the cell ID group, the information on the number of transmit antennas, and the frame timing, which are cell-specific information may be used to determine an assignment of sequence numbers to the two types of short codes, or a method of assigning the sequence numbers to the two types of short codes may be used to report the cell-specific information such as the frame timing.

Moreover, as disclosed in non-patent document 18, for example, at least an information set out of the cell-specific information sets may be reported using M-PSK modulation (where M is an arbitrary integer).

Moreover, as disclosed in non-patent document 19, for example, a 90-degree phase rotation may be applied between the two types of short codes.

Moreover, as disclosed in non-patent document 20, for example, multiple types (for example, 8 types) of short codes may be used.

Even when information sets such as the number of the transmit antennas and the radio frame timing are reported as surrounding cell information, the number of sequences to be detected may be decreased.

The P-SCH sequence generated by the P-SCH generator 252 is input to the multiplexer 260, while the S-SCH sequence generated by the S-SCH generator 254 is input to the multiplier 256. The sync signal controller $209_1$ inputs, to the scramble sequence generator 258, information showing the scramble sequence. For example, the sync signal controller $209_1$ inputs, to the scramble sequence generator 258, information indicating a scramble code common to all cells. Based on the input information indicating the scramble sequence that is input by the sync signal controller $209_1$, the scramble sequence generator 258 generates the scramble sequence to input the generated sequence into the multiplier 256. In the multiplier 256, the scramble sequence is multiplied with the S-SCH, and the scramble sequence-multiplied S-SCH sequence is input to the multiplexer 260. As the scramble sequence length, scrambling (spreading) may be performed over the two types of short codes, or scrambling may be performed on the respective two types of short codes. Depending on the multiple types of scramble sequences, any one of e.g., system information sets for the S-SCH sequence, e.g., the frame timing, cell ID group, and information on the number of transmit antennas may be reported. In this way, the S-SCH sequence PAPR may be decreased, especially in the 1.25 MHz system.

However, the probability of detecting the S-SCH by the user apparatus is reduced due to interference from a neighboring cell when the neighboring cell and/or a cell within the same base station uses the same S-SCH sequence. Thus, it takes time for the cell search, leading to the degraded cell search time characteristics. From the point of view that the interference from the neighboring cell is randomized to overcome this problem, the sync signal controller $209_1$ preferably inputs, into the scramble sequence generator 258, information indicating a scramble sequence which is different per cell from multiple types of scramble codes. In this case, as the S-SCH scramble code, scramble sequences which differ from one cell to another, or multiple types of scramble sequences may be used, or the scramble sequence which differ from one base station to another may be used. In this case, based on the information indicating the scramble sequence that is input by the sync signal controller $209_1$, the scramble sequence generator 258 generates the scramble sequence to input the generated sequence into the multiplier 256. Here, for the scramble sequence to be generated, a P-SCH sequence-specific scramble sequence that is collated with a P-SCH sequence number may be generated. Moreover, as disclosed in Non-patent document 21, for example, of the two types of short codes, a scramble sequence specific to the sequence number of one of the short codes may be generated. In the multiplier 256, the scramble sequence input by the scramble sequence generator 258 is multiplied with the S-SCH sequence, and the multiplied result is input into the multiplexer 260. As the scramble sequence length, scrambling may be performed over the two types of short codes, or scrambling may be performed on the respective two types of short codes. For example, for the scramble sequence to be multiplied, the scramble sequence specific to all cells may be used, or a P-SCH sequence-specific scramble sequence may be used, or multiple types of scramble sequences may be used; or of the two types of short codes, the scramble sequence specific to the sequence number of one of the short codes may be used. Moreover, of the two types of short codes, one of the short codes may be multiplied with the scramble sequence common to all cells, and the other of the short codes may be multiplied with the scramble sequence specific to the P-SCH sequence. Furthermore, of the two types of short codes, one of the short codes may be multiplied with the scramble sequence specific to the P-SCH sequence, and the other of the short codes may be multiplied with the scramble sequence specific to the short code sequence number, for example. Depending of the multiple types of scramble sequences, any one of e.g., system information sets for the S-SCH sequence, e.g., the frame timing, cell ID group, and information on the number of transmit antennas may be reported. The multiplexer 260 multiplexes the P-SCH sequence and the scramble-sequence multiplied S-SCH sequence so as to input the multiplexed result into the data modulator $209_3$.

The sync signal sequence generated by the sync signal generator $209_2$ is data modulated in the data modulator $209_3$, and further serial/parallel converted in the serial/parallel converter $209_4$, so that the serial/parallel converted result is converted to $N_{SCH}$ symbol sequences on the frequency axis. In the multiplier $209_5$, an amplitude adjusting sequence value input by the amplitude adjusting unit $209_6$ is multiplied with the $N_{SCH}$ symbol signals, and the multiplied result is output to the combiner $208_{11}$.

Figure 11:
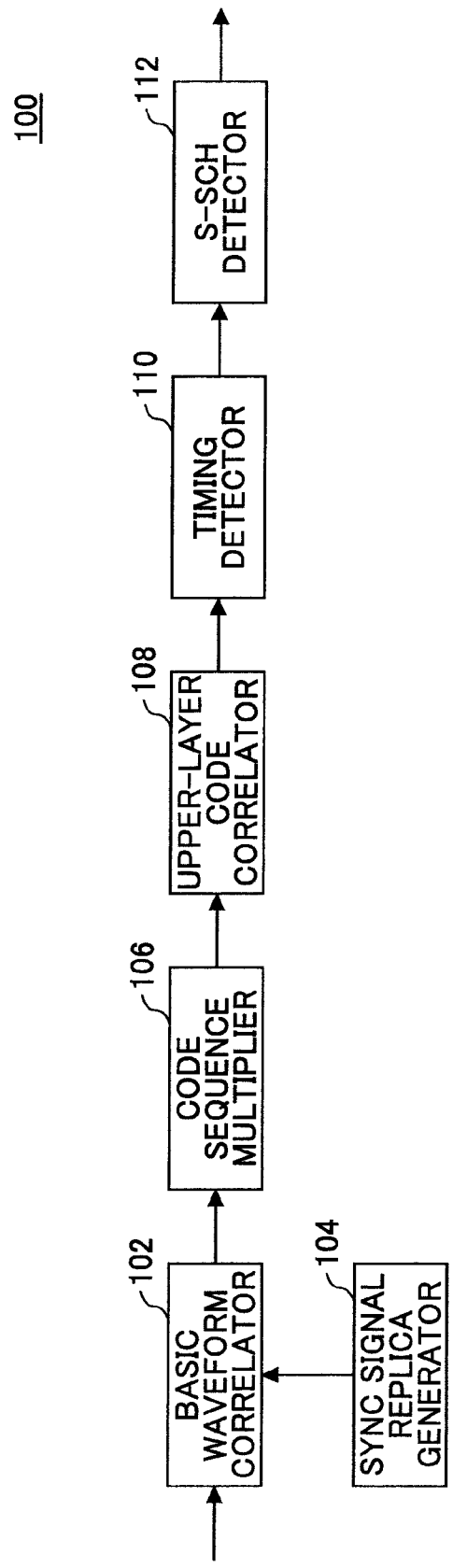
FIG. 11 is a partial block diagram illustrating a mobile station apparatus according to an embodiment of the present invention.

Next, a mobile station 100 according to the embodiment of the present invention is described with reference to FIG. 11.

The mobile station 100 includes a basic waveform correlator 102, a sync signal replica generator 104, a code sequence multiplier 106, an upper-layer code correlator 108, a timing detector 110, and an S-SCH detector 112.

The mobile station 100 inputs, into the basic waveform correlator 102, a multi-carrier signal received by an antenna. On the other hand, the sync signal replica generator 104 generates a sync signal replica of a basic waveform that is set in advance, and successively inputs the generated results into the basic waveform correlator 102. In the basic waveform correlator 102, a correlation is detected between the received multi-carrier signal and the basic waveform sync signal replica. The code sequence multiplier 106 multiplies (or code inverts) the code sequence to be an output of the basic waveform correlator 102 with respect to the basic waveform. The upper-layer code correlator 108 detects a correlation of an upper-layer code with respect to the output of the code sequence multiplier 106. In this way, the P-SCH replica is correlated.

The timing detector 110 detects the P-SCH timing and P-SCH sequence number from the correlated value. When the P-SCH sequence number is detected, the scramble sequence-multiplied S-SCH sequence is descrambled. Then, based on the detected P-SCH timing, the S-SCH is detected at the S-SCH detector 112 with the P-SCH as a reference signal. Here, when the cell ID group has been reported as the advance information, for example, the radio frame timing and the information on the number of transmit antennas are detected. It is necessary to descramble after sync detection when scrambling is applied at the base station.

A more specific explanation is provided below.

The cell search is conducted using the P-SCH and S-SCH that are included in the downlink signal. Based on the P-SCH sequence and the S-SCH sequence that are defined by the radio communications system 1000 as described above, the cell search is conducted. In other words, by detecting the P-SCH sequence and the S-SCH sequence, the cell ID or the cell ID group is detected. Then, after detecting the cell ID, using the scrambling code associated with the cell ID, broadcast information (e.g., primary broadcast channel) is received, completing the cell search process. Details of the P-SCH sequence and the sync signal transmission pattern that are defined by the radio communications system 1000 are omitted due to being the same as the explanation in the base station apparatus $200_m$.

Figure 8:
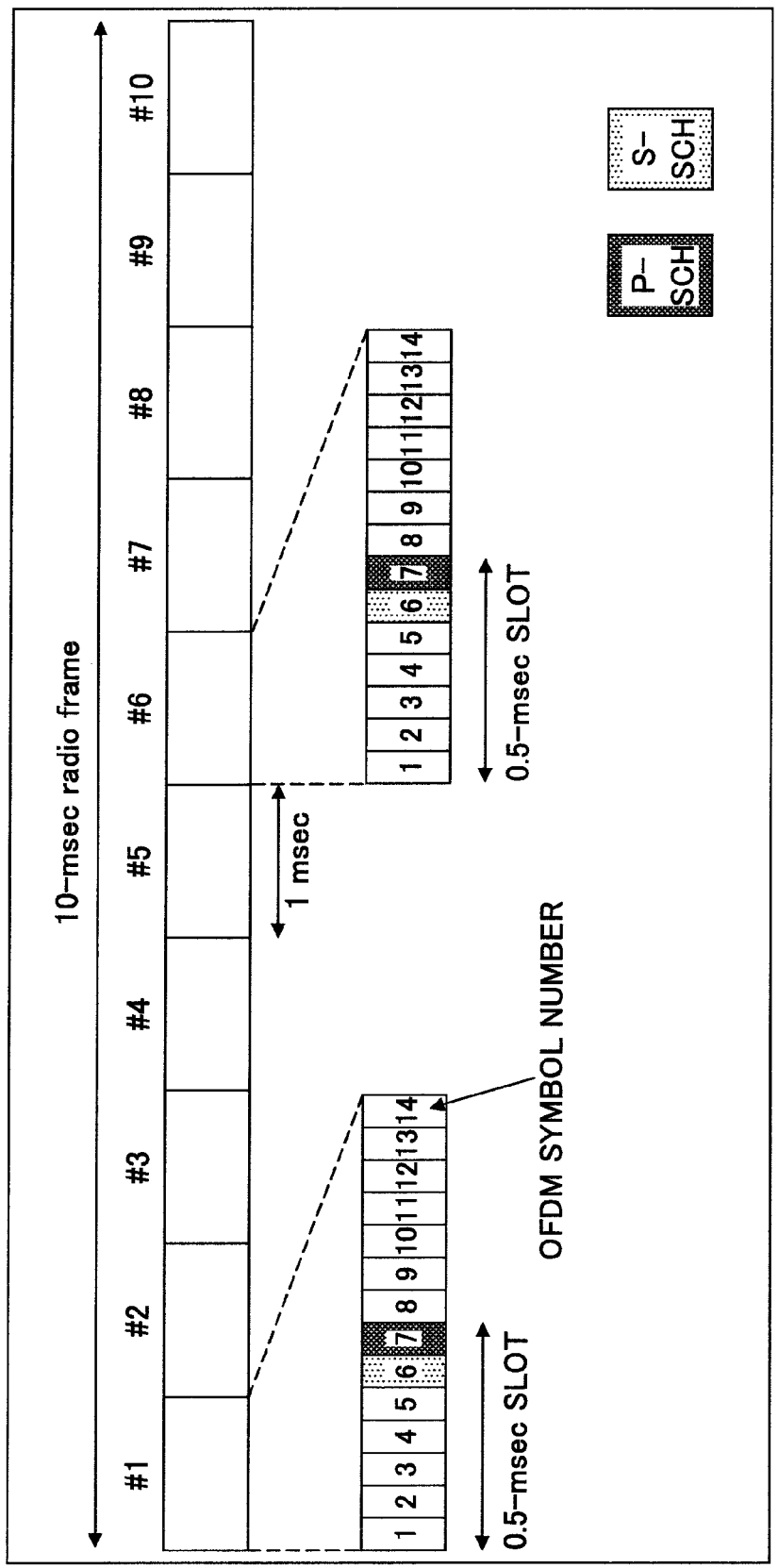
FIG. 8 is diagram for explaining an exemplary definition of a synchronization signal transmission pattern.

For example, when the radio communications system 1000 defines the sync signal transmission patterns in FIG. 8 and the P-SCH sequence number and the cell ID information are associated in advance, the timing detector 110 detects the sync channel timing and the P-SCH sequence number. Moreover, the S-SCH detector 112 descrambles using the scramble sequence multiplied with the S-SCH sequence, for example, and detects information elements included in the S-SCH to make it possible to detect the cell-specific information sets.

Next, a method of transmitting sync channels according to the embodiment of the present invention is described.

The S-SCH generator 254 selects multiple sync signal sequences. For example, in the radio frame timings #1 and #2, two types of sequences, a sequence having 16 short codes with the sequence length of 32 (the first layer cell ID group indicator #1) and another sequence having 16 short codes with the sequence length of 32 (the second layer cell ID group indicator #2) are selected. Then, the S-SCH generator 254 generates advance information to be reported to the mobile station in advance. For example, advance information indicating the first layer cell ID group, which is part of information for specifying the cell ID group, is generated. The generated advance information is transmitted.

Moreover, the S-SCH generator 254 generates the secondary sync channel using the selected multiple sync signal sequences. For example, a secondary sync channel is generated that indicates the first layer cell ID group which is a part of information for specifying a cell ID group and the second layer cell ID group which is a part of information for specifying a cell ID group. The sync signal controller $209_1$ inputs, to the scramble sequence generator 258, information indicating the scramble sequence. For example, the sync signal controller $209_1$ inputs, to the scramble sequence generator 258, information indicating a scramble code common to all of the cells. Moreover, the sync signal controller $209_1$, for example, inputs, to the scramble sequence generator 258, information indicating multiple types of scramble codes. The secondary sync channel is input to the multiplier 256, where the scramble sequence generated by the scramble generator 258 is multiplied with the input secondary sync channel, so that the multiplied result is transmitted.

The mobile station detects the cell-specific information using the advance information and secondary sync channel.

Figure 12:
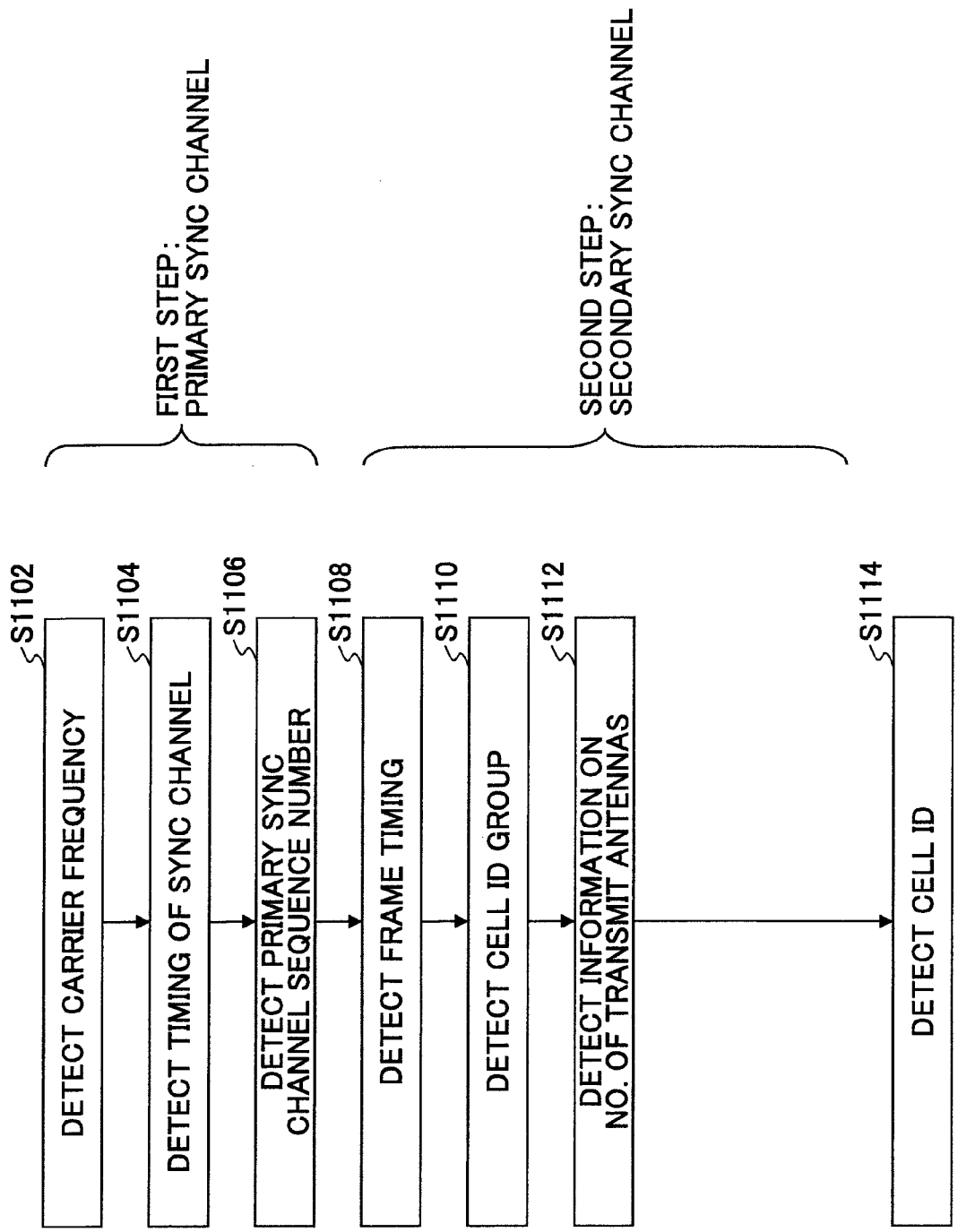
FIG. 12 is a flow diagram illustrating a cell searching method according to an embodiment of the present invention.

Next, a cell search method in the radio communications system 1000 according to the present embodiment is described with reference to FIG. 12.

As a first step, the mobile station detects the correlation between a primary sync channel sequence and a receive signal, and detects the carrier frequency and timing of the primary sync channel (S1102, S1104). As a result, a primary sync channel sequence number is detected (step S1106). In this first step, the mobile station may determine the signal phase difference and compensates for the frequency offset.

Once the primary sync channel timing, the carrier frequency, and the primary sync channel sequence number are known, the secondary sync channel timing and carrier frequency also become known. The scramble sequence-multiplied secondary sync channel is descrambled.

Next, frame timing is detected from a secondary sync channel sequence specific to a cell used in the secondary sync channel (S1108). Typically, multiple (for example, 2) sync channels are arranged in one frame, so that it is necessary to detect the frame timing after detecting the timing. Moreover, the cell ID group is detected from the cell-specific secondary sync channel sequence (S1110).

Here, reporting to the mobile station in advance part or all of the cell ID groups as advance information, for example, makes it possible to reduce the number of candidate specific information sets to be detected, thus allowing increased detection accuracy. As a result, the characteristics may be improved. As the advance information, the radio frame timing may be reported or the information on the number of antennas may be reported.

When the base station has multiple transmit antennas, it may report, to the mobile station, the information on the number of transmit antennas in the secondary sync channel, and, in the second step, the mobile station may detect the number of transmit antennas (MIMO (Multiple Input Multiple Outputs) information on the number of antennas) (S1112). In particular, the information on the number of transmit antennas used for the base station to transmit the broadcast channel may be detected.

Next, the cell ID is detected using the cell ID group detected in the second step and the primary sync channel sequence number detected in the first step (S1114).

Next, a radio communications system having base and mobile station apparatuses according to other embodiments of the present invention is described. The radio communications system, base station apparatus, and mobile station according to the present embodiments are configured in a manner similar to those described with reference to FIGS. 3, 6, 7, and 11.

In the base station apparatus 200 according to the present embodiments, the sync signal controller $209_1$ inputs, to the scramble sequence generator 258, information showing the P-SCH sequence-specific scramble sequence based on the P-SCH sequence number. In this case, based on the information indicating the scramble sequence that is input by the sync signal controller $209_1$, the scramble sequence generator 258 generates the scramble sequence to input the generated sequence into the multiplier 256. In the multiplier 256, the P-SCH sequence-specific scramble sequence is multiplied with the S-SCH sequence, and the multiplied result is input into the multiplexer 260. In this case, the P-SCH sequence number and the scramble sequence number are specified such that they are collated. In the P-SCH, sequences which are different from one sector to another are selected, so that a different scramble sequence is multiplied with the S-SCH. For example, the three-sector cell P-SCH sequences are selected from a set which includes three different sequences, so that the scramble sequence to be multiplied with the S-SCH sequence is selected from a set which includes three different scramble sequences.

The timing detector 110 of the mobile station 100 detects the P-SCH timing and the P-SCH sequence number from the value of correlation between the output of the code sequence multiplier 106 and the upper-layer code. When the P-SCH sequence number is detected, the P-SCH sequence specific scramble sequence-multiplied S-SCH sequence is descrambled. Then, based on the detected P-SCH timing, the S-SCH is detected at the S-SCH detector 112 with the P-SCH as a reference signal.

Moreover, in the cell search method, in the flow described with reference to FIG. 12, the primary sync channel sequence number is detected in step S1106. Using the detected primary sync channel sequence number, a primary sync channel-specific scramble sequence multiplied with the secondary-sync channel also becomes known. The primary sync channel-specific scramble sequence-multiplied secondary sync channel is descrambled. Then, the process proceeds to step S1108.

In this way, when neighboring cells and/or cells in the same base station are using the same S-SCH sequence, randomizing interference from a neighboring cell is made possible, allowing improved probability in detecting the S-SCH. As a result, the time needed for the cell search may be reduced, allowing improved cell search time characteristics.

Moreover, in detecting the S-SCH, channel estimation may be made taking into account the channel state for each cell when the channel estimation is performed based on the P-SCH sequence, making it possible to improve the channel estimation accuracy. The ability to improve the channel estimation accuracy allows the S-SCH detection accuracy to be improved.

Moreover, in the present embodiments, the P-SCH-specific scramble sequence is applied (multiplied) with the S-SCH sequence. When the mobile station detects the SCH symbol timing in an initial stage (a first stage) of the cell search, it also detects the P-SCH sequence number at the same time. In this way, the P-SCH sequence number corresponds one to one with the scramble sequence number multiplied with the S-SCH. Thus, the S-SCH scramble sequence number is determined based on the detected P-SCH sequence number. Therefore, there is no need to detect multiple types (for example, three types) of S-SCH scramble sequence numbers. Therefore, in detecting the S-SCH sequence, it is made possible to generate three types of S-SCH scramble sequences without increasing the amount of computation.

Figure 13:
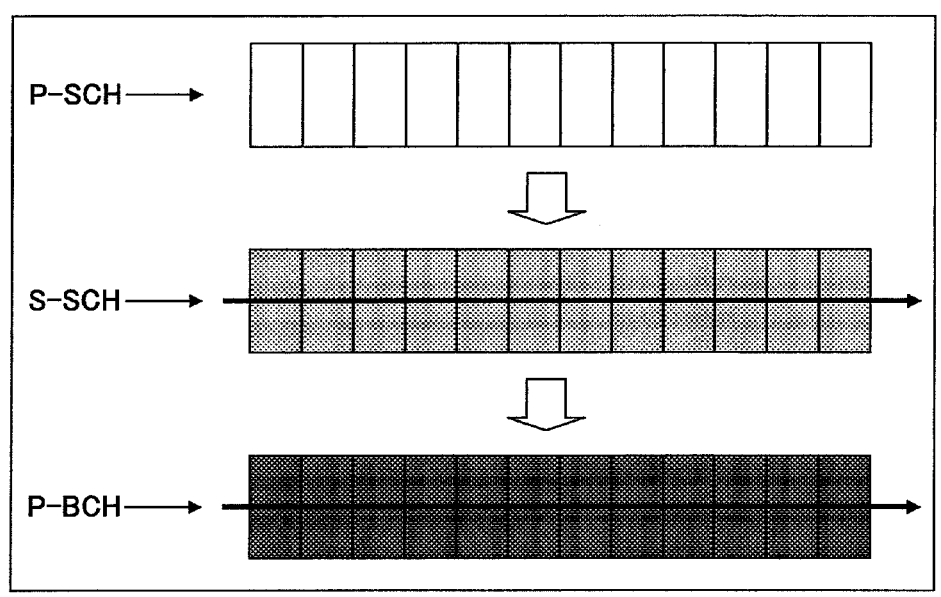
FIG. 13 is a diagram for explaining a method of generating a scramble code in a primary broadcast channel.

Moreover, in detecting the primary broadcast channel (P-BCH), it is made possible to generate 510 types of scramble sequences without increasing the amount of computation. As described above, in detecting the S-SCH sequence, it is made possible to generate three types of scramble sequences without increasing the amount of computation. The above is next explained with reference to FIG. 13. The P-SCH, which includes three types of scramble sequences, does not undergo the scrambling process. The S-SCH undergoes the scrambling process using a P-SCH-specific scramble sequence (for example, three types of scramble codes). The P-BCH undergoes the scrambling process using a cell-specific scramble sequence (for example, 510 types of scramble codes). The S-SCH sequence reports 170 types of cell ID group information using an orthogonal sequence (for example, two types of short codes). Therefore, in demodulating the P-BCH, it is made possible to generate (three types of scramble sequences)×(170 types of cell ID group information)=510 types of scramble codes without increasing the amount of computation.

Moreover, in demodulating the P-BCH, when the channel estimation is conducted based on the S-SCH sequence, it is made possible to conduct the channel estimation taking into account the channel state per channel, allowing improved channel estimation accuracy. The ability to improve the channel estimation accuracy allows the P-BCH demodulation accuracy to be improved.

In the above-described embodiments, an exemplary system to which Evolved UTRA and UTRAN (also called Long Term Evolution or Super 3G) is applied has been described. However, the mobile and base station apparatuses, and the method of transmitting the sync channels are applicable in all systems using the Orthogonal Frequency Division Multiplexing (OFDM) in downlink.

For convenience of explanation, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person will understand variations, modifications, alternatives, replacements, etc. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-161945, filed on Jun. 19, 2007, and Japanese Patent Application No. 2007-167009, filed on Jun. 25, 2007, the entire contents of which are hereby incorporated by reference.

The invention claimed is:

1. A base station apparatus which communicates with a mobile station using an OFDM scheme in downlink, comprising:
   a first generating unit which generates a primary sync channel;
   a second generating unit which generates a secondary sync channel by scrambling, using two types of mutually different scrambled sequences, on each of two types of short codes to be alternately arranged in frequency domain; and
   a transmitting unit which transmits the primary sync channel generated at the first generating unit and the secondary sync channel generated at the second generating unit,
   wherein the first generating unit generates the primary sync channel based on a primary sync channel sequence number, and
   wherein the second generating unit uses a scrambled sequence associated with the primary sync channel sequence number.

2. The base station apparatus as claimed in claim 1, wherein a sequence length of each of the two types of short codes used in the second generating unit is half a sequence length of the secondary sync channel, and wherein a sequence length of each of the two types of scrambled sequences used in the second generating unit is the same as a sequence length of a short code.

3. The base station apparatus as claimed in claim 1, wherein one of the two types of scrambled sequences used in the second generating unit is specific to the primary sync channel sequence number and the other of the two types of scrambled sequences is specific to another short code sequence number.

4. The base station apparatus as claimed in claim 1, wherein the second generating unit uses M on each of the two types of short codes.

5. The base station apparatus as claimed in claim 1, wherein the second generating unit uses the two types of short codes according to a short code sequence number.

6. The base station apparatus as claimed in claim 1, wherein the second generating unit uses a scrambled sequence which differs from cell to cell.

7. The base station apparatus as claimed in claim 1, wherein the transmitting unit reports cell-specific information using the secondary sync channel, and the cell-specific information includes at least one information set out of a cell ID group, a radio frame timing and information on the number of transmit antennas.

8. The base station apparatus as claimed in claim 7, further comprising an advance information generating unit which generates advance information to be reported in advance to the mobile station, wherein the advance information includes at least one information set out of: information indicating a part of the cell ID group, information indicating the cell ID group, information indicating the radio frame timing, information indicating the number of transmit antennas, and information combining the information indicating the part of the cell ID group, the information indicating the cell ID group, the information indicating the radio frame timing, and the information indicating the number of transmit antennas.

9. A method of transmitting in a base station apparatus which communicates with a mobile station in downlink using an OFDM scheme, comprising the steps of:
   generating a primary sync channel;
   generating a secondary sync channel by scrambling, using two types of mutually different scrambled sequences, on each of two types of short codes to be alternately arranged in frequency domain; and
   transmitting the primary sync channel and the secondary sync channel,
   wherein the step of generating the primary sync channel generates the primary sync channel based on a primary sync channel sequence number and
   wherein the step of generating the secondary sync channel uses a scrambled sequence associated with the primary sync channel sequence number.

10. The method of transmitting as claimed in claim 9, wherein a sequence length of each of the two types of short codes used in the step of generating the secondary sync channel is half a sequence length of the secondary sync channel, and wherein a sequence length of each of the two types of scrambled sequences to be used in the step of generating the secondary sync channel is the same as a sequence length of a short code.

11. The method of transmitting as claimed in claim 9, wherein one of the two types of scrambled sequences used in the step of generating the secondary sync channel is specific to the primary sync channel sequence number and the other of the two types of scrambled sequences is specific to another short code sequence number.

12. The method of transmitting as claimed in claim 9, wherein the step of generating the secondary sync channel uses M sequences on each of the two types of short codes.

13. The method of transmitting as claimed in claim 9, wherein the step of generating the secondary sync channel uses the two types of short codes according to a short code sequence number.

14. The method of transmitting as claimed in claim 9, wherein the step of generating the secondary sync channel uses a scrambled sequence which differs from cell to cell.

15. The method of transmitting as claimed in claim 9, wherein the step of transmitting reports cell-specific information using the secondary sync channel, and the cell-specific information includes at least one information set out of a cell ID group, a radio frame timing and information on the number of transmit antennas.

16. The method of transmitting as claimed in claim 15, further comprising the step of generating advance information to be reported in advance to the mobile station, wherein the advance information includes at least one information set out of: information indicating a part of the cell ID group, information indicating the cell ID group, information indicating the radio frame timing, information indicating the number of transmit antennas, and information combining the information indicating the part of the cell ID group, the information indicating the cell ID group, the information indicating the radio frame timing, and the information indicating the number of transmit antennas.

17. A radio communications system, comprising:
a mobile station; and
a base station apparatus which communicates with the mobile station using an OFDM scheme in downlink,
wherein the base station apparatus, generates a primary sync channel based on a primary sync channel sequence number, generates a secondary sync channel by scrambling, using two types of mutually different scrambled sequences which are associated with the primary sync channel sequence number, on two types of short codes to be alternately arranged in frequency domain, and transmits the primary sync channel and the secondary sync channel.

* * * * *